(12) United States Patent
Yamanashi et al.

(10) Patent No.: US 7,291,288 B2
(45) Date of Patent: Nov. 6, 2007

(54) ARTIFICIAL STONE AND FORMATION THEREFOR

(75) Inventors: Sumiyo Yamanashi, Tokyo (JP); Mieko Sakai, Tokyo (JP); Kenichiro Saito, Chiba (JP)

(73) Assignee: Availvs Corporation, Tokyo (JP)

( * ) Notice: Subject to any disclaimer, the term of this patent is extended or adjusted under 35 U.S.C. 154(b) by 0 days.

(21) Appl. No.: 11/355,959

(22) Filed: Feb. 17, 2006

(65) Prior Publication Data
US 2006/0138385 A1    Jun. 29, 2006

Related U.S. Application Data

(63) Continuation of application No. 10/998,037, filed on Nov. 29, 2004, now abandoned, which is a continuation of application No. 09/968,797, filed on Oct. 3, 2001, now abandoned.

(51) Int. Cl.
*C09K 11/08* (2006.01)
*C09K 11/00* (2006.01)
*B32B 3/00* (2006.01)
*B32B 37/14* (2006.01)

(52) U.S. Cl. .................. 252/301.36; 428/690

(58) Field of Classification Search ............ 252/301.36
See application file for complete search history.

(56) References Cited

U.S. PATENT DOCUMENTS 6,136,226 A * 10/2000 Sakai ................... 252/301.35
6,146,548 A    11/2000 Sakai
6,309,562 B1   10/2001 Sakai et al.
6,627,315 B2 *  9/2003 Sakai ........................ 428/406

FOREIGN PATENT DOCUMENTS

| JP | 11-292595 | * 10/1999 |
| WO | 98/35919 | 8/1998 |
| WO | 98/39268 | 9/1998 |
| WO | WO 98/39268 | * 9/1998 |
| WO | 99/36370 | 7/1999 |

* cited by examiner

*Primary Examiner*—C. Melissa Koslow
(74) *Attorney, Agent, or Firm*—Wenderoth, Lind & Ponack, L.L.P.

(57) ABSTRACT

To provide a further improvement of luminescence performance such as an extension of a continuation time of a light accumulation luminescence or a luminescence by ultraviolet rays, by a control of the structure of the artificial stone. A noctilucent/luminescent artificial stone including a transparent aggregate, at least one kind of a light accumulation material and a luminescent material by ultraviolet rays along with a resin is characterized by that the luminescence performance of the artificial stone is higher than that of the included light accumulation material or luminescent material by ultraviolet rays per se.

51 Claims, 4 Drawing Sheets

ARTIFICIAL STONE AND FORMATION THEREFOR

This application is a Continuation application of Ser. No. 10/998,037, filed Nov. 29, 2004, now abandoned, which is a Continuation application of Ser. No. 09/968,797, filed Oct. 3, 2001, now abandoned.

TECHNICAL FIELD

The present invention relates to an artificial stone and its formation. More particularly, the present invention relates to a noctilucent and/or luminescent artificial stone which is useful for a building material, a view material, or the like such as a direction indicator, or a location guide with a decorative or a dark-field illumination taking advantage of the luminosity with an accumulation of light or an absorption of ultraviolet rays, and its formation.

BACKGROUND ART

An artificial stone caked from a mixture of a crushed natural stone with a resin or the like is conventionally known. Various ideas have been carried out to make this artificial stone have a design of a natural stone style such as marble or granite and besides superior hardness and strength.

As a trial for improving a function and performance of such an artificial stone, it is proposed to give a luminosity function to the artificial stone with using a luminescent substance such as a noctilucent substance like a light accumulation material or an ultraviolet ray luminescent material emitting light with ultraviolet rays absorption.

For instance, a luminescent tile which consists of an inorganic filler, a synthetic resin, and a light accumulation pigment and includes an inorganic filler of more than about 50% of the total amount, is proposed (Japanese Patent Laid-Open No. 60-137862). For instance, on this luminescent tile, a board of 3 to 5 mm thick is proposed, which is molded and hardened from a composition of; 75 wt % of silica sand as an inorganic filler with an average particle diameter of 0.2 mm or more, 15 wt % of syrup consisting of MMA polymer/MMA monomer of 25/75 in a weight ratio, and 9 wt % of a light accumulation pigment.

In addition, a luminescent material obtained from the following composition is proposed; a natural or synthesized luminescent stone emitting light by ultraviolet rays and an adhesive resin of 4 to 10 wt % against a total amount along with a natural or synthesized aggregate (Japanese Patent Laid-Open No. 8-119706).

However, a luminescent material such as a conventional artificial tile or artificial stone which is made noctilucent, for instance, by the above light accumulation pigment has several hours at most; for sustaining a declining brightness over 3 mcd/m$^2$ which is a lower limit at which a person can ensure a contour of things, from a saturated state after irradiation at 200 Lx with a D65 commonly used light source; and the above proposed material (Japanese Patent Laid-Open No. 60-137862) has only one hour.

In addition, there was a problem that brightness required for a clear visibility which is thought to be necessary for a refuge instruction in a power cut for about 15 minutes was not in an enough level. These problems were common as a problem that enough luminescence performance is not obtained either in case of a light emission by ultraviolet rays.

Furthermore, there was a problem that only a surface layer of 1 mm deep at most from the surface can emit light and a light accumulation material or the like included in a deeper side of a compact of an artificial stone can not act at all, in either a case of an artificial stone (an artificial tile) being made noctilucent by blending a light accumulation pigment or a case of an artificial stone being made luminescent by ultraviolet rays.

For this reason, a thick light emission layer could not be provided. Thus there was a fundamental problem on luminescence performance described above that an extension of an noctilucent time was difficult, for instance, on an noctilucent artificial stone mixed with a light accumulation material.

Actually, owing to these problems, a practical use taking advantage of light accumulation noctilucence which function attracts attention as refuge induction guides in a power cut in an underground shopping center, for instance, is limited to a paint, tape, or a film which includes the light accumulation material.

It is not practical from the view point of a cost to blend a luminescent substance in an artificial stone as parts which do not contribute to a light emission actually, because the noctilucent substance such as a light accumulation material and the luminescent substance with ultraviolet rays are expensive and raise a whole cost of an artificial stone product to 3 to 10 times higher even with a small quantity of addition.

In addition, a conventional artificial stone could not be employed for floor materials, for instance, to which an abrasion resistance is required, as it has a problem not only in the luminescence performance but also in a physical property such as a strength, an abrasion resistance, and weatherability.

Thus, the performance and the use of the conventional artificial stone which is noctiluscent or luminescent with ultraviolet rays were extremely limited.

Considering these situations, the present inventors have proposed an artificial stone; which realizes a high strength and high hardness as an artificial stone including an inorganic aggregate and filler with a resin and a deep hue like a natural stone; allows a light emission with thickness by blending a light accumulation material or an ultraviolet ray luminescent material; enables a contour thickness as an artificial stone to be bigger; and besides enables a luminescent time to be longer (for instance, WO98/39268, WO98/35919).

These proposals are essentially characterized by; using several groups of inorganic materials which average particle diameters are different, in a specific blending ratio; employing transparent inorganic materials for groups with bigger particle diameters; blending light accumulation materials or ultraviolet ray luminescent materials for groups with smaller particle diameters, or coating them beforehand on the surface of the transparent inorganic particles with bigger particle diameters by baking or the like.

And these proposals were based on new findings that it is possible to increase a thickness contributing to a luminosity of a light accumulation material or the like by means of controlling an inner structure of the artificial stone.

Actually, an artificial stone based on the proposal of the present inventors enables brightness of 3 mcd/m$^2$ or more to continue for about 8 hours.

However, after that, the present inventors have investigated as a big subject to control a relationship between a structure of the artificial stone and the luminescence performance; for the purpose of improving the luminescence performance of light accumulation materials and luminescent materials with ultraviolet rays, for raising the initial brightness of light accumulation luminescence and besides enabling the luminosity at a predetermined brightness to continue for a longer time.

It is to realize a light accumulation luminescent artificial stone which shows in maximum non energetic luminescence performance of a predetermined brightness at night or in a power cut and a light emissive artificial stone with ultraviolet rays radiation which shows an energy-saving property in maximum. Besides, concerning on the control, the present inventors have investigated as a subject to sustain and improve a physical property of extremely high quality and high function such as strength, surface hardness, abrasion resistance, weatherability, a color tone, and waterproofing/chemical resistance, for instance, which the present inventors have realized till now.

DISCLOSURE OF INVENTION

The present invention provides the following artificial stones as a solving method for the above subjects; according to a first aspect, an artificial stone including at least one kind selected from a transparent aggregate, a light accumulation material, or a luminescent material by ultraviolet rays along with a resin being characterized by having higher luminescence performance of the artificial stone than that of the included light accumulation material and/or luminescent material by ultraviolet rays per se; according to a second aspect, said artificial stone being characterized by having high luminescence performance in a lower filling factor (vol %) of the artificial stone than the maximum filling factor (vol %) of the included light accumulation material and/or luminescent material by ultraviolet rays per se.

In addition, the present invention provides; according to a third aspect, the artificial stone including a transparent aggregate and at least one kind selected from a light accumulation material or a luminescent material by ultraviolet rays along with a resin being characterized by that a particle diameter is 0.1 mm or more and 1/1.5 or less of a thickness of the artificial stone after cast and hardened.

In addition, the present invention provides the followings related to the third aspect; according to a fourth aspect, the artificial stone characterized by that a particle diameter of aggregates is 0.3 mm or more; according to a fifth aspect, the artificial stone characterized by that an average particle diameter of the transparent aggregates is 1/20 or more and 1/3 or less of a thickness of the artificial stone after cast and hardened; according to a sixth aspect, the artificial stone characterized by that the transparent aggregates have an irregular surface configuration.

The present invention further provides; according to a seventh aspect, the artificial stone according to the above any one characterized by that each average particle diameter of a light accumulation material and/or a luminescent material by ultraviolet rays is 10 μm or more and 300 μm or less; and according to an eighth aspect, the artificial stone characterized by that the average particle diameter is 40 μm or more and 150 μm or less.

The present invention provides; according to a ninth aspect, the artificial stone according to the above any one characterized by including an inorganic filler with a particle diameter less than 0.1 mm; and according to a tenth aspect, the artificial stone characterized by that the average particle diameter of the filler is 30 μm or more and 70 μm or less.

The present invention provides; according to an eleventh aspect, the artificial stone according to the above any one characterized by that a volume rate of a transparency aggregate is 20% or more and 80% or less; and according to a twelfth aspect, the artificial stone characterized by that a volume ratio of a filler to a light accumulation material, a luminescent material by ultraviolet rays, or the mixture of the both is 0 or more and 100 or less as filler/(light accumulation material and/or luminescent material by ultraviolet rays).

The present invention provides, according to a thirteenth aspect, the artificial stone characterized by that the transparent aggregate is quartz or rock crystal and the filler is aluminium hydroxide or silica.

The present invention provides, according to a fourteenth aspect, the artificial stone characterized by that the transparent aggregate is a glass and the filler is silica or aluminium hydroxide.

Furthermore, the present invention provides; according to a fifteenth aspect, the artificial stone according to the above any one characterized by including a nontransparent aggregate along with a transparent aggregate and by that the particle diameter is 1/1.5 or less of a thickness of the artificial stone after cast and hardened and a total volume rate of a transparency aggregate and a nontransparent aggregate is 20% or more and 80% or less of the artificial stone.

The present invention provides, according to a sixteenth aspect, the artificial stone according to the above any one characterized by that a time from a saturated state after an exposure at 200 Lx with the D65 commonly used light source to brightness of 3 mcd/$m^2$ is 12 hours or longer.

The present invention provides; according to a seventeenth aspect, the artificial stone characterized by that the artificial stone of the above any one is lamination constituted as a surface material; and according to an eighteenth aspect, the artificial stone characterized by that the artificial stone of the above any one is constituted as a part of the surface.

The present invention as mentioned in the above is based on knowledges as the following which could be get as a result of the detailed examination by the inventor.

In other words, noctilucence/luminescence performance is improved greatly with a structure of an artificial stone and its control, as for a structure/control in that case, <1> Particle diameter of transparent aggregate;

<2> Configuration of transparent aggregate;

<3> Particle diameter of light accumulation material/ultraviolet rays luminescent material;

<4> Volume rate of transparent aggregate, and volume ratio against filler;

<5> Sort of transparent aggregate, and combination of it and sort of filler;

an above-mentioned factor, etc is made important, and it is effective to control these factors to a specified condition like the present invention. These factors were made clear for the first time by an investigation of the present inventors.

BEST MODE FOR CARRYING OUT THE INVENTION

Figure 1:
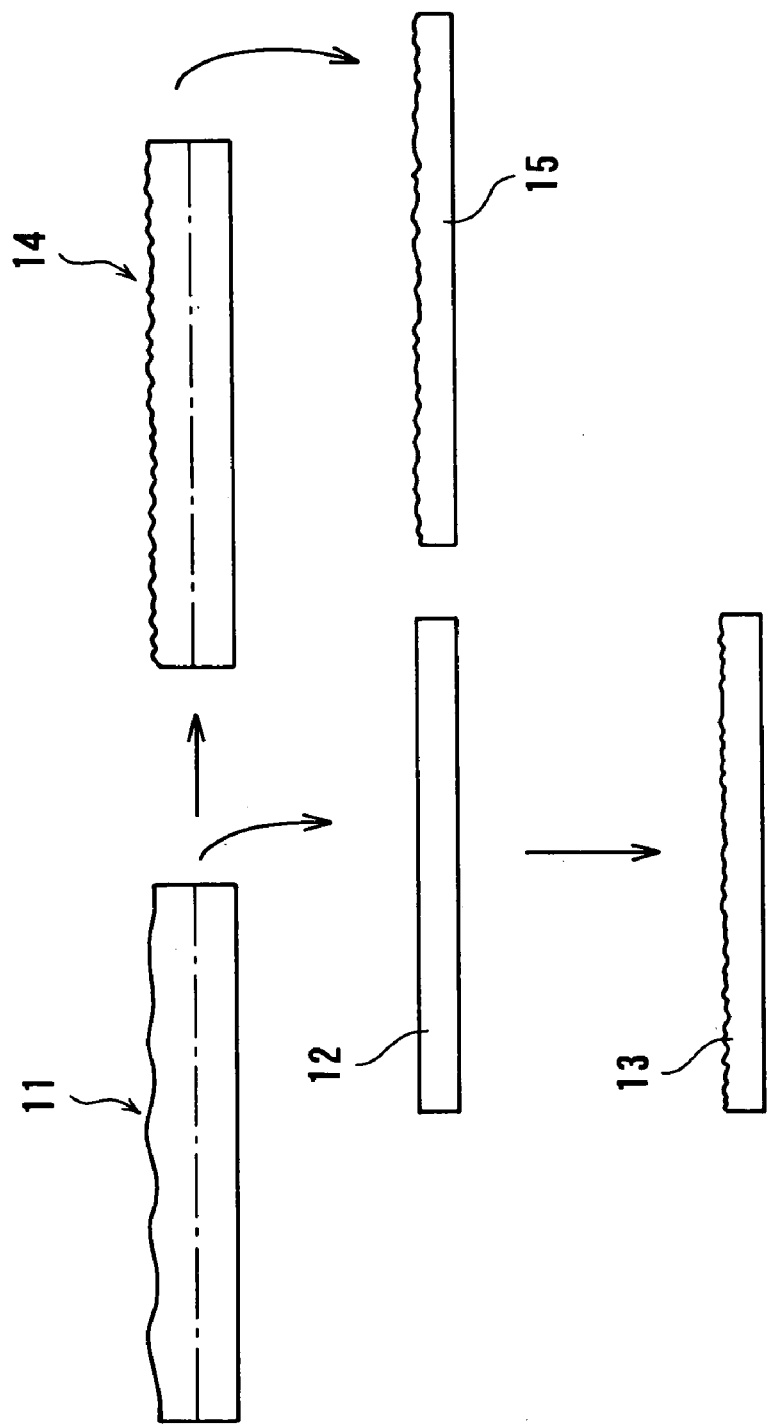
FIG. 1 illustrates an aspect of cutting out the artificial stone and the surface processing.

The present invention has the above described features. Preferred embodiments of the present invention will be described hereinafter.

Fundamentally, the concept in the present invention was not known in prior art at all. The above first and second inventions are provided as a new technical concept which even the present inventors had not acquired as a finding before.

In other words, the noctilucent/luminescent artificial stone of the present invention is an artificial stone including a transparent aggregate, at least one kind selected from a light accumulation material and a luminescent material by ultraviolet rays, and a filler mixed if needed along with a resin; being characterized by having higher luminescence performance of the artificial stone than that of the included light accumulation material and/or luminescent material by ultraviolet rays per se.

The luminescence performance with such a feature has never been thought till now. It means that an artificial stone of the present invention, namely is realized as a blended complex with not only a light accumulation material and/or a luminescent material by ultraviolet rays but also a transparent aggregate, a resin, etc, has superior luminescence performance to that of a luminescent material and/or a luminescent material by ultraviolet rays per se.

The artificial stone having the superior luminescence performance is provided for the first time by the present inventors.

The luminescence performance of a light accumulation material and/or a luminescent material by ultraviolet rays per se, is evaluated in the following ways, for instance.

As for sole luminescence performance of these light accumulation materials and/or luminescent materials by ultraviolet rays per se, since these are used in a form of particles, first of all, these particles are charged in a transparent vessel with an upper part opened and with a same depth as a thickness of the artificial stone in casting, and are pressurized with a vibration to be a close packed state. The condition shows the condition where particles consisting of light accumulation materials and/or luminescent materials by ultraviolet rays are packed in maximum keeping the initial size and shape without being damaged, and the condition where any longer it cannot be filled up anymore. This condition is composed by these particles and air existing among these.

Then, the luminescence performance can be measured in such a close packed state.

For instance, after making each strontium aluminate based light accumulation materials (made in NEMOTO & Co., Ltd.) with different particle diameters into the closed packing state in the container with a depth of 5 mm, and carrying out an irradiation at 200 Lx with the D65 light source for 60 minutes (more than saturation time), initial brightness after 15 minutes and a decay time until brightness declines to 3 mcd/m$^2$ was measured, and it was shown in Table 1.

TABLE 1

| Light accumulation material | Average particle diameter (μm) | | | | | |
|---|---|---|---|---|---|---|
|  | 10 | 20 | 40 | 80 | 150 | 300 |
| Maximum filling factor (volume %) | 30.56 | 36.11 | 38.89 | 41.67 | 44.44 | 47.26 |
| Specific gravity | 1.1 | 1.3 | 1.4 | 1.5 | 1.6 | 1.7 |
| True specific gravity | 3.6 | 3.6 | 3.6 | 3.6 | 3.6 | 3.6 |
| Brightness after 15 minutes (mcd/m$^2$) | 102.3 | 148.5 | 189.3 | 301.8 | 405.6 | 395.2 |
| Decay time to 3 mcd/m$^2$ | 5 h 30 m | 7 h 15 m | 10 h 45 m | 14 h 15 m | 18 h | 17 h |

On the other hand, an artificial stone including a light accumulation material with an average particle diameter of 150 μm shown in Table 1 as a composition, was cast and hardened to be an artificial stone of 5 mm thick, and its luminescence performance was measured. The results are shown in correspondence with a filling factor (volume %) of a light accumulation material in Table 2.

TABLE 2

| Light accumulation material filling factor (volume %) | Brightness after 15 minutes (mcd/m$^2$) | Decay time to 3 mcd/m$^2$ |
|---|---|---|
| 0.29 | 61.29 | 1 h 35 m |
| 1.44 | 105.3 | 6 h |
| 3.19 | 178.6 | 10 h 45 m |
| 4.37 | 217.6 | 11 h 45 m |
| 11.19 | 372.3 | 19 h 45 m |
| 15.61 | 426.1 | 24 h |

By the way, brightness and its decay in Table 1 and Table 2 are measured with "BW33 luminance meter" made by TOPCON CORPORATION. It is similar in the following description as well.

As is clear, for instance, in a comparison between Table 1 and Table 2 for a case of a light accumulation material of average particle diameter 150 μm, it is understood that the decay time to 3 mcd/m$^2$ of an example of an artificial stone with a filling factor of 11.19 volume % in the present invention was 19 hours and 45 minutes which exceeded a level of 18 hours of a light accumulation material per se; and that initial brightness after 15 minutes of an artificial stone with a filling factor of 15.61 volume % was also higher than that of a light accumulation material per se.

These kind of results are confirmed not only in case of a light accumulation material with an average particle diameter of 150 μm, but also in any case with 10 to 300 μm shown in Table 1.

It is thought to be common that the luminescence performance of a sole luminescent material will drop by means of being blended with other components. However, it is surprising that the luminescence performance of the artificial stone of the present invention is superior to that of a sole light accumulation material, in other words, that the luminescence performance is, on the contrary, improved with blending, being different from such a common knowledge.

The following reasons can be guessed.

In the artificial stone, almost all light accumulation materials can effectively absorb an energy of light (ultraviolet rays) given with radiation such as a sun light and a fluorescence light, as a result of scattering or irregular reflection of the light in inside of the artificial stone due to a blend or a conjugation with transparent aggregates and others.

Therefore, the absorbed light in inside of the artificial stone is accumulated effectively and the luminescence can be made effective.

The above-mentioned phenomenon is recognized not only in a light accumulation material but also in luminescent materials by ultraviolet rays of the present invention.

Thus, in the present invention, a composition is provided for a preferred artificial stone to allow the above-mentioned phenomenon.

This artificial stone, at first, comprises an inorganic aggregate, a light accumulation material (in other words, a light accumulation luminescent material) or a luminescent material emitting light by means of ultraviolet irradiation, and a resin, wherein a part or a whole of said inorganic aggregate consists of a transparent aggregate. When a transparent aggregate is one part of the inorganic aggregate, the ratio is determined with a consideration to a physical function which is needed by an application of a noctilucent/luminescent artificial stone of the present invention or its formation, and to a luminescent function.

Therefore, in the present invention, the transparent aggregate is included as an indispensable matter.

And the artificial stone includes, as needed, an inorganic or organic filler, and a minor constituent of a silane coupling agent, a hardening agent, or the like.

A transparent aggregate in these compositions includes inorganic substances with a high transparency such as quartz (silica rock), rock crystal, glass, and silica, for instance. For these transparent aggregates, an inorganic aggregate such as natural rocks of non-transparency, minerals, and ceramics can be concomitantly employed in a permitted range.

A filler blended with an aggregate as needed is small granule powder with a much finer particle diameter than aggregate, and includes, for instance, inorganic substances such as aluminium hydroxide, glass powder, silica powder, quartz (silica rock) powder, and calcium carbonate, and organic substances such as plastic powder or a plastic bead.

For a light accumulation material or a luminescent material by ultraviolet rays, various kinds of materials including a conventionally known material or a commercial material can be employed appropriately. There is, for instance, a strontium aluminate base substance, a zinc sulfide base substance, or the like.

As a result of further investigation on details of the noctilucent/luminescent artificial stone which inventors have already proposed, the present inventors have found that the luminescence performance can be unexpectedly and remarkably improved with a minute control of the structure, and have proposed the followings. One of the important factors is, in the first place, a particle diameter of a transparent aggregate.

By the way, the luminescence performance is evaluated with a light accumulation luminescence in the following. In the evaluation method, according to JIS "light accumulation safety sign board" Z9100-1987, after irradiating at 200 Lx by the D65 common light source until brightness is saturated, a decay time until brightness becomes 3 mcd/m$^2$ is considered as the standard in the case of evaluating a performance. Incidentally, brightness of 3 mcd/m$^2$ is considered to be a lower limit at which a person can visibly identify a contour of a thing. In addition, in the present invention, brightness at an elapsed time after irradiation such as initial brightness after 15 minutes is also evaluated.

In the present invention, the particle diameter of the transparent aggregate is determined to be 0.1 mm or more and 1/1.5 or less of a thickness of the artificial stone after the artificial stone was cast and hardened. In the above, "cast and hardened" means a state that a material mixture or a composition of the artificial stone in a flow condition is formed and hardened with compression or the like after being cast in a mold or is formed and hardened to a predetermined shape from the flow condition by means of a continuous belt formation or the like. The particle diameter of a transparent aggregate is determined to be 1/1.5 or less of a thickness of the artificial stone in such a "cast and hardened" state.

In the present invention, a preferable particle diameter of the aggregate is determined to be 0.3 mm or more.

In case of a particle diameter of a transparent aggregate with less than 0.1 mm, the decay time to brightness of 3 mcd/m$^2$ is merely several hours, namely, 1 to 3 hours which is the same performance as the conventional one. In order to make the time at least six hours, the maximum particle diameter of the transparent aggregate must be 0.1 mm or more of a thickness of the artificial stone. In order to make the time for reaching form the saturated state to the brightness of 3 mcd/m$^2$ 8 hours or longer and further 12 hours or longer, the preferable particle diameter may be 0.3 mm or more.

On the other hand, the particle diameter should be 1/1.5 or less of the thickness of the artificial stone. Because, in a case exceeding 1/1.5, a practical noctilucent/luminescent artificial stone is not actually provided, as a physical property such as strength required to the artificial stone is difficult to be obtained after the artificial stone was cast and hardened.

The luminescence performance of the artificial stone (a board thickness of 5 mm) including merely 2 vol % (3.89 wt %) of an strontium aluminate base light accumulation material (NEMOTO & Co., Ltd., G-300C) for a light accumulation material, for instance, is indicated in Table 3. In Table 3, the results are shown with the decay time after a saturated state being irradiated at 200 Lx with the D65 commonly used light source for 60 minutes.

A composition (volume %) of the artificial stone is as follows.

| | |
|---|---|
| Quartz (pulverized product) | 19.98 |
| Aluminium hydroxide | 32.11 |
| (average particle diameter 40 μm) | |
| Light accumulation material | 2.00 |
| (average particle diameter 40 μm) | |
| MMA resin | 44.74 |
| Others | remainder |
| (Silane coupling agent, a hardening agent, etc.) | |

(Silane coupling agent, a hardening agent, etc.)

TABLE 3

| Luminescent time after irradiation by light (hr) | Quartz diameter range (mm) | | | | |
|---|---|---|---|---|---|
| | 2.5-1.2 | 1.2-0.6 | 0.6-0.3 | 0.3-0.1 | Less than 0.1 |
| 1 | 35.47 | 29.48 | 30.39 | 24.56 | 14.23 |
| 2 | 16.82 | 13.20 | 13.16 | 11.13 | 3.871 |
| 4 | 7.253 | 5.957 | 5.671 | 4.971 | |
| 6 | 4.372 | 3.972 | 3.872 | 3.082 | |
| 8 | 3.326 | 3.121 | 3.012 | | |
| 10 | 3.087 | | | | |

In the table 3, about samples including merely 2 vol % of a light accumulation material, change of the brightness ($mcd/m^2$) by the time after radiation is shown for every quartz particle diameter range.

Table 3 shows that it is necessary to set the aggregate particle diameter to 0.1 mm or more, and that it is desirable to set aggregate particle diameter to 0.3 mm or more in order to make time to 3 $mcd/m^2$ into 6 hours or longer.

In addition, when the particle diameter of the transparent aggregate exceeded 1/1.5 of the board thickness, that is 3.4 mm, though the result is not shown in Table 1, the cast and hardened artificial stone had a weak bend strength and was not a practical product.

In addition, when the aggregate particle diameter is less than 0.1 mm, the luminescence performance was improved with an increase of blending rate of a light accumulation material. However, as a light accumulation material is an extremely expensive, it is not practical to increase the used quantity at all. For this reason, it is extremely important for the noctilucent/luminescent artificial stone to achieve the best luminescence performance with a minimum use rate of a light accumulation material.

In such a point of view, a prescription of the particle diameter of the transparent aggregate related to the present invention shows a conspicuity of the invention.

In the present invention, the average particle diameter of the transparent aggregate is further preferably 1/20 or more and 1/3 or less of the thickness of the cast and hardened artificial stone. By making average particle diameter into this range, it becomes possible to lengthen certainly the decay time until brightness declines to 3 $mcd/m^2$ in 12 hours or longer.

Table 4 shows changes of the decay time to brightness of 3 $mcd/m^2$ with variation of average particle diameters of quartz on the artificial stone (board thickness of 5 mm) of the following composition (volume %);

| | |
|---|---|
| Quartz (pulverized product) | 49 |
| Aluminium hydroxide (average particle diameter 40 μm) | 14 |
| Light accumulation material G-300C (average particle diameter 40 μm) | 5 |
| MMA resin | 31 |

In the above composition, minor constituents such as a silane coupling agent or a hardening agent are omitted. It is similar in the following description as well.

TABLE 4

| Maximum particle diameter (mm) | Average particle diameter (mm) | Time to 3 $mcd/m^2$ |
|---|---|---|
| 2.38 | 0.25 | 12 h 15 m |
| 2.38 | 1.0 | 13 h 30 m |
| 2.38 | 1.2 | 13 h 45 m |
| 2.38 | 1.6 | 13 h |
| 2.38 | 1.8 | 9 h 45 m |

*Time to 3 $mcd/m^2$ after irradiation at $D_{65}200Lx \times 60$ minutes (more than saturation time) is shown.

From Table 4, a significance of the average particle diameter with 1/20 or more and 1/3 or less of a board thickness of a cast and hardened artificial stone is understood.

On the other hand, it is preferable to employ a transparent aggregate, having not a regular crystal cleavage plane and not a spherical shape but an irregular surface configuration. This is characterized at first in a comparison between quartz (silica rock) and rock crystal. These are usually pulverized to become a predetermined particle diameter of product. A pulverized product of rock crystal tends to have a regular surface as it is highly crystallized. On the other hand, a quartz product does not have such a tendency. The quartz product consists of grains with an irregular and rough-hewn surface configuration as a whole. In addition, in case of a glass bulb, there is not such an irregular surface on it as is seen on a pulverized product of quartz or normal glass.

Such a difference affects the luminescence performance of the noctilucent/luminescent artificial stone.

Table 5 shows such a contrast.

In any case, composition (volume %) was as follows.

| | |
|---|---|
| Transparent aggregate | 50 |
| Aluminium hydroxide | 14 |
| Light accumulation material G-300C | 5 |
| MMA resin | 30 |

The maximum particle diameter of the transparent aggregate was 2.38 mm, and the board thickness of cast and hardened artificial stone was 5 mm. The decay time to 3 $mcd/m^2$ after irradiation at 200 Lx with the D65 commonly used light source to a saturated state is shown in Table 5.

TABLE 5

| Transparent aggregate | Decay time to 3 $mcd/m^2$ |
|---|---|
| Glass pulverization product | 11 h 45 m |
| Glass ball | 9 h |
| Quartz pulverization product | 13 h |
| Rock crystal pulverization product | 8 h 30 m |

A clear contrast is recognized in Table 5. It is guessed that such a contrast reflects a degree of irregular refraction frequency in grains of the light which entered the transparent aggregate. It is conceivable that rock crystal with a highly crystallized plane or a glass ball with a spherical surface has less degree of such an irregularity than the pulverized product of quartz or glass.

When it explains more as for the light accumulation material blended with the noctilucent/luminescent artificial stone in case of the present invention, according to the examination by the present inventors, it confirms that it is excellent with a viewpoint of the luminous performance as much as the particle diameter of the light accumulation material is large, that the time necessary for irradiation by light for reaching the initial saturated state gets long on one side as much as a particle diameter is large.

For instance, about the artificial stone including 5 vol % of a light accumulation material, 49 vol % of an aggregate and 31 vol % of MMA resin, as is shown in Table 6, it is understood that it is desirable to use a strontium aluminate base light accumulation material with an average particle diameter of 20 μm or more, further preferably 40 μm or more, in order to extend the decay time to brightness of 3 mcd/m$^2$ after irradiation at 200 Lx with D65 to a saturated state in more than 12 hours.

TABLE 6

| Brightness/time | Average particle diameter of light accumulation material (μm) | | | | |
|---|---|---|---|---|---|
| | 10 | 20 | 40 | 80 | 150 |
| Brightness after ten hours (mcd/m$^2$) | 3.213 | 3.809 | 4.346 | 4.529 | 4.975 |
| Brightness after 12 hours (mcd/m$^2$) | — | 3.007 | 3.415 | 3.523 | 4.079 |
| Decay time to 3 mcd/m$^2$ | 10 h 15 m | 12 h | 13 h 15 m | 13 h 30 m | 15 h 15 m |

In the present conditions, it is desirable to employ the average particle diameter of less than about 300 μm and further preferably less than 150 μm from a view point of availability.

In addition, in the artificial stone of the present invention, an inorganic filler with a smaller particle diameter than the inorganic aggregate such as said transparent aggregate, in other words, with a particle diameter less than 0.1 mm, can be used. A blend of these inorganic fillers is not always needed for a composition of the noctilucent/luminescent artificial stone of the present invention. However, the filler is expected to enable a used amount of a resin in a composition of the artificial stone to be reduced, to contribute to a dense structure of the artificial stone, and further to contribute to an effective luminescence with a little amount of used light accumulation materials.

The preferable average particle diameter of these filler is 30 μm or more and 70 μm or less.

The filler with a particle diameter of 0.1 mm or more makes it difficult to provide a dense structure in the artificial stone, and consequently makes a factor for decreasing the luminescence performance.

In the noctilucent/luminescent artificial stone of the present invention, blending ratio of the aggregate, filler, and a light accumulation material and/or a luminescent material should be paid attention along with a definition on the particle diameter as the above. In the blending ratio, especially, a volume rate occupying in a three-dimensional structure of the artificial stone is important. According to our findings, the volume rate is clearly appreciable factor from the viewpoint of the luminescence performance along with a physical property of the artificial stone as a three-dimensional structure.

In the noctilucent/luminescent artificial stone of the present invention, a preferable volume rate of the transparent aggregate is determined to be 20% or more and 80% or less. When the filler is employed, though it is not specifically limited, it is a desirable mode to control filler/light accumulation material and/or luminescent material by ultraviolet rays (by the volume ratio) into 100 or less.

Table 7 shows a decay time to brightness of 3 mcd/m$^2$ after irradiation at 200 Lx with the D65 commonly used light source to a saturated state, for samples consisting of; strontium aluminate base light accumulation material (G-300C) with an average particle diameter of 40 μm as the light accumulation material, aluminium hydroxide with an average particle diameter of 40 μm as the filler, quartz (a pulverized product) with a maximum particle diameter of 2.38 mm and an average particle diameter of 1.2 mm as the transparent aggregate, and MMA resin.

TABLE 7

| | Aggregate (quartz) volume rate (%) | | | | |
|---|---|---|---|---|---|
| | 10 | 20 | 60 | 80 | 90 |
| Time to 3 mcd/m$^2$ (hr) | 6.5 | 12.5 | 13.5 | 12 | 8.5 |

From Table 7, it is understood that the above prescribed range enables the decay time to 3 mcd/m$^2$ to be 12 hours or longer.

Furthermore, in the noctilucent/luminescent artificial stone of the present invention, the luminescence performance can be improved by means of a combination with the transparency aggregate and the filler. Table 8 shows the above combinations. The employed materials are; the transparent aggregate with a maximum particle diameter of 2.38 mm and an average particle diameter of 0.8 mm, the filler with an average particle diameter of 40 μm, and the light accumulation material (strontium aluminate base: G 300C) with an average particle diameter of 40 μm. The volume ratios are; 50% of a transparent aggregate, 30% of a MMA resin, 15% of the filler, and 5% of the light accumulation material.

TABLE 8

| Transparent aggregate | Filler | Brightness after hour of one irradiation by light (mcd/m$^2$) | Decay time to 3 mcd/m$^2$ |
|---|---|---|---|
| Quartz (pulverized product) | Aluminium hydroxide | 25.83 | 13 h 30 m |
| | Silica | 24.98 | 12 h |
| | Glass powder | 23.71 | 5 h |
| Glass* (pulverized product) | Silica | 57.49 | 12 h 15 m |
| | Aluminium hydroxide | 52.04 | 12 h |
| | Glass powder | 25.26 | 6 h 15 m |
| | Calcium carbonate | 38.14 | 8 h |
| | Quartz powder | 18.68 | 4 h 45 m |

*Commonly commercial soda glass is used for glass.

Table 8 also shows results after irradiation at 200 Lx with the D65 commonly used light source to a saturated state. It is understood that aluminium hydroxide or silica as the filler is preferable for quartz as the transparency aggregate, and that silica or aluminium hydroxide is preferable for glass.

In addition, it is understood that selection of such combinations enables the decay time to 3 mcd/m$^2$ to become 12 hours or longer.

It is grasped in Table 9 from a contrast of a light transmittance that the effective luminescence performance with these combinations is seen in case of luminescent materials by ultraviolet rays.

TABLE 9

| Transparent aggregate | Filler | All beam permeability (%) | Diffusivity (%) | Black light Permeability (%) |
|---|---|---|---|---|
| Glass (pulverized product) | Silica | 48.6 | 45.5 | 14.3 |
| | Aluminium hydroxide | 44.1 | 41.2 | 12.9 |
| | Glass powder | 35.4 | 33.2 | 11.7 |
| | Calcium carbonate | 21.8 | 20.4 | 2.3 |
| | Quartz powder | 22.5 | 21.0 | 5.2 |

Table 9 shows the results on samples of the glass for the transparent aggregate in Table 7. It is well understood that the above combination is preferable.

As is described in the above, for instance, the present invention provides a noctilucent/luminescent artificial stone including the transparent aggregate, the filler, and the light accumulation material along with a resin characterized by that the time to 3 mcd/m² after irradiation at 200 Lx with the D65 commonly used light source to a saturated state is 12 hours at least.

The artificial stone of the present invention having the superior luminescence performance as described in the above may have various compositions as above and various manufacturing methods as well.

About composition, an appropriate blending with function components such as the filler and trace components along with the above transparent inorganic aggregate and a resin may be considered for the artificial stone from the viewpoint of strength, weatherability, abrasion resistance, surface non-slipperiness, a color tone, incombustibility, and other many functions.

Of course, the transparent aggregate may occupy a whole amount of aggregate components as was described already, or inorganic aggregates of non-transparency may be used jointly as one part of aggregates, in the noctilucent/luminescent artificial stone of the present invention. However, even in the case of the combined use, the amount of the transparent aggregate is preferably 20 vol % or more and 80 vol % or less of the cast and hardened artificial stone in order to realize the superior performance like 12 hours or longer of the decay time to brightness of 3 mcd/m² after irradiation at 200 Lx with the D65 commonly used light source to a saturated state.

The total amount of the transparent aggregate and non-transparent aggregate is preferable to be similarly in a range of 20 vol % or more and 80 vol % or less.

It is needless to say that the inorganic aggregate including the non-transparent aggregate should have a maximum particle diameter of 1/1.5 or less of the board thickness after cast and hardened and may be blended as a mixture with various particle diameters having a particle diameter distribution.

In practical, it is preferable that the inorganic aggregate consisting of the transparent aggregate or the transparent aggregate and non-transparent aggregate has a particle diameter distribution of a close-packing or the vicinity as is well known in a concrete engineering, and besides that the average particle diameter is 1/20 or more and 1/3 or less of the thickness of the cast and hardened artificial stone as is described above.

In addition, it should be a naturally considered point what kind of color tone and design in bright field would be the obtained noctilucent/luminescent artificial stone. An appearance of granite and marble is often aimed at because the product is hard to be obtained as they are natural and their color and luster are beautiful. In this case, the color and luster is an important subject to determine a value of granite and marble. There are various sorts of colors in the natural granite and marble, such as complete black to white or red, and different degrees in the same color.

When giving a color to each kind of an artificial stone, a color reproducibility is a problem to obtain a product with a medium color tone, though, in case of a black product, for instance, just black particulate matters of natural rocks have only to be used. In addition, it is not so easy to obtain the unique luster of the marble, even if the color is obtained.

It used to be difficult to give a luster or a depth, even in the case of giving a color by a blended resin with dye or pigment.

As opposed to this, in the artificial stone of the present invention, transparent inorganic aggregates can be principally employed. For instance, the transparent inorganic aggregate obtained by crushing quartz base natural rock, glass, or fused silica can be employed.

By means of employing these transparent aggregates, the color of the artificial stone in a bright field can be controlled and allowed to have a depth and a luster owing to the existence of a quartz base granule component with transparency.

In addition, in the noctilucent/luminescent artificial stone of the present invention, the much finer filler than the aggregate is employed along with it, for instance, preferably, with a particle diameter of 0.1 mm or less and an average particle diameter of 30 μm or more and 70 μm or less. The filler includes natural or various kinds of artificial materials preferably such as aluminium hydroxide, silica, and glass powder, for instance. These inorganic fillers have much finer particle diameter than the above aggregates, and contribute to properties such as hardness, softness, and surface non-slipperiness of the obtained artificial stone, while they invade into spaces among the inorganic aggregates and locate to fill the spaces among grains.

As a part of blend for these fillers, components such as manganese dioxide, titanium dioxide, zirconium silicate, and iron oxide may be added for adjusting a color tone; and antimony trioxide, boron compound, bromine compound and the like for giving a flame retardance.

In addition, an inorganic antimicrobial agent may be combined. The artificial stone of antibacterial activity is useful for a bathroom, floor of rest rooms, wall, and handrail, for instance. It is also useful in a medical facility, a food processing facility, and the like.

As an inorganic antimicrobial agent, there are silver, zinc, and copper base inorganic materials, for instance.

Resins can be selected from the wide range as described above.

The resin includes, for instance, an acrylic resin, a methacrylic resin, an unsaturated polyester resin, an epoxide resin, a silicone resin, a silicone rubber, and the like. In these, a methacrylic resin, an epoxide resin, the mixture, or the copolymerization resin is shown to be preferable.

An organic pigment such as an azo base, a phthalocyanine base, dye, etc. may be blended to these resins in order to adjust the color tone.

In addition, a light stabilizer or a fire retardant may be included.

Resin components contribute to wrapping the aggregate and the filler which are component for forming a skeleton of the artificial stone and bonding the whole, and have a function for giving an elasticity or a tensile strength to the completed artificial stone.

About resin component, the volume rate may be about 70% or less, but more preferably in practical 25 vol % or more and 35 vol % or less when characteristics such as strength, durability, natural rock-like appearance, and tint, or non-slipperiness and the like for the artificial stone are considered.

The artificial stone product with an excessive resin component appears plastics, and the artificial stone becomes merely nominal. When the resin component is excessively little, the product becomes fragile and not suitable for use though the appearance of the product approaches to a natural tone.

About resin components in the present invention, every kind of resin can realize the artificial stone having the superior and essential performance for the noctilucent/luminescent artificial stone. However, a methacrylic resin, particularly MMA (methyl methacrylate) resin is preferably employed as a main component, in the artificial stone for the use to which weatherability, chemical resistance, hardness, abrasion resistance, transparency, depth of color tone and the like are demanded.

Instead of the main composition of the artificial stone consisting of the inorganic aggregate, the inorganic filler, and the resin as described above, the flexible composite with high hardness which have been already proposed by the present inventors can be composed for the artificial stone similar to the noctilucent/luminescent artificial stone.

That is an artificial stone with a surface hardness of 400 or more with Vickers hardness (JIS Z2244) and a radius of curvature of R25 mm at which bending is possible without damaging for a board of 3 to 15 mm thick.

In the composite, the inorganic components including the inorganic aggregate can occupy 50 vol % or more of the total and organic components such as resin can be less than 50 vol %. A main component of the organic component is a methacrylate resin. More concretely, it is shown as a denatured MMA resin with blending polymethylmethacrylate (PMMA) and one or more materials selected from methyl methacrylate (MMA) monomer, 2-ethylhexyl methacrylate monomer, 2-ethylhexyl acrylate monomer, 2-ethyl pentyl methacrylate monomer, butylmethacrylate monomer, and cyclohexyl methacrylate monomer.

Table 10 shows the light accumulation luminescence performance namely the noctilucent property of the artificial stone obtained with each kind of resin.

The employed materials are; the aggregate of pulverized quartz with a maximum particle diameter of 2.38 mm and an average particle diameter of 1.2 mm, a filler of aluminium hydroxide with average particle diameter of 40 μm, and a strontium aluminate base light accumulation material with an average particle diameter of 40 μm. The compositions are 50 vol % of the aggregate, 13 vol % of the filler, 5 vol % of the light accumulation material, and 30 vol % of the resin. The thickness of the cast and hardened artificial stone is 5 mm.

TABLE 10

| Resin | Brightness after one hour of irradiation by light (mcd/m$^2$) | Decay time to 3 mcd/m$^2$ |
|---|---|---|
| MMA resin | 58.72 | 12 h |
| Unsaturated polyester (DAINIPPON INK AND CHEMICALS, INCORPORATED "FG208") | 57.85 | 11 h 30 m |

TABLE 10-continued

| Resin | Brightness after one hour of irradiation by light (mcd/m$^2$) | Decay time to 3 mcd/m$^2$ |
|---|---|---|
| Degeneration MMA resin (Mitsubishi Rayon Co., Ltd. "XD7005") | 57.98 | 11 h 45 m |

*Light irradiation . . . irradiation at 200Lx with D65 for 60 minutes (more than saturation time)

In addition, in the noctilucent/luminescent artificial stone of the present invention, the above transparent aggregate may be baked or coated at a room temperature with a noctilucenct light accumulation material or a luminescent material by ultraviolet rays.

In case of a coating with baking, fine particles with a diameter of several μm to several dozens μm, for instance, 5 to 50 μm, more preferably 20 to 40 μm may be coated on the surface of the transparent aggregate particles. More concretely, the coating can be carried out with a baking at a high temperature of around 120 to 1200° C.

The luminescent coating substance may include various kind of light accumulating substances or light emitting substances by ultraviolet irradiation such as strontium aluminate and zinc sulfide.

As for a baking method, various conventional methods may be employed. For instance, the transparent inorganic aggregates are mixed in a dispersed solution of particles of light accumulation materials such as strontium aluminate or the paste, are dried and baked.

A coating at a room temperature can be done in the above dispersion solution or a paste with a transparent sticky substance (binder).

The noctilucent/luminescent artificial stone of the present invention can be made with casting and hardening a liquid or floating mixed raw material or composition.

Casting and hardening can be done with a casting formation, a compression molding, and a stepless belt formation.

A compression molding, for instance, is done in the following way; casting, beforehand, a necessary quantity of the composition for the completed product such as inorganic aggregate, filler, and resin components into a drag as a horizontal molding-flask; matching a cope; and compression molding, for instance, with a bearing stress of 5 to 100 kgf/cm$^2$. At a compression of this molding, the composition can be heated to a temperature of roughly 80 to 180° C. for 5 minutes to several hours.

In addition, in the compression molding with heating, oscillation can be given to the molding-flask along with compression to improve a flowability of the above material in the molding-flask.

Of course, a shape for the real product with the artificial stone in the present invention does not need to be limited to a flat board. It may be an induction projection for an eyesight handicapped person, have a surface with projections, or be composed as a stepped shape. Many other shapes may be considered.

In the present invention, a rough-surfaced processing may be done on the surface of a cast and hardened compact.

As a method for this purpose, first of all, a selective removal method of a resin component is adopted. In other words, skin surface processing with squirting highly pressurized water onto a surface of a compact after removing from a molding-flask, for instance, is effective. That is water-jet machining.

In this water-jet machining, many conditions are selected; such as a surface hardness and a surface strength of the processed material, and a hydraulic pressure, a diameter of an ejection nozzle, and a distance between a material surface and a nozzle outlet for forming a predetermined depth of grooves on the surface in uniformity coping with these properties. It is not defining, but, for instance, a hydraulic pressure of about 100 to 1500 kgf/cm$^2$ can be usually employed for a nozzle of around 5 to 50 mm high.

There is no limit in particular about a nozzle for squirting highly pressurized water and the system. All kinds of nozzles are employed.

By means of water-jet machining, surface roughening is realized and the artificial stone, for instance, with non-slipperiness and a deep touch of a material is produced. Besides, what should be emphasized in the present invention, is no clouding of a color of the artificial stone by means of water-jet machining.

The noctilucent/luminescent artificial stone of the present invention needs to provide non-slipperiness when an application, for instance, for a passage or a step in which refuge induction is needed at the dark background atmosphere such as a road or a platform and a step in a station in a power cut is considered. Water-jet machining can give such non-slipperiness to the artificial stone.

As for giving the non-slipperiness, the present inventors have proposed in other invention an artificial stone; fundamentally including an inorganic aggregate and a resin and having a convexoconcave surface in which inorganic aggregates are exposed, wherein an average depth of the surface grooves are 0.02 mm or more and 1.0 mm or less, particularly of 0.05 mm or more and 0.8 mm or less.

By the above invention, the followings are enabled to be provided; a non-slippery artificial stone including an inorganic aggregate and a resin and having a convexoconcave surface in which inorganic aggregates are exposed, being characterized by that a skid resistance value BPN (ASTM E303) is 60 or more at a wetting face and 20 or more at an oil face, and a non slippery artificial stone characterized by that a skid resistance value BPN is 65 or more at a wetting face and 35 or more at an oil face; a non slippery artificial stone including an inorganic aggregate and a resin and having a convexoconcave surface in which inorganic aggregates are exposed, being characterized by that a skid resistance value C.S.R. (JIS A 5705 and JIS A 1454 are referenced) is 0.8 or more at a wetting face for men's shoes and a non slippery artificial stone characterized by that a skid resistance value C.S.R. is 0.45 or more at an oil face; an on slippery artificial stone including an inorganic aggregate and a resin and having a convexoconcave surface in which inorganic aggregates are exposed, being characterized by that a skid resistance value C.S.R.B. (JIS A 5705 and JIS A 1454 are referenced) is 1.4 or more at a wetting face for a barefoot and a non slippery artificial stone characterized by that a skid resistance value C.S.R.B. is 0.8 or more at a wetting face with soap for a barefoot; and a non slippery artificial stone including an inorganic aggregate and a resin and having a convexoconcave surface in which inorganic aggregates are exposed, being characterized by that a surface contact angle of distilled water is 45 to 75 degree on an average.

A scraped amount from the surface of the artificial stone by water-jet machining is about 10 cm$^3$/m$^2$ from a view point of a surface concave groove depth of 0.02 to 1.0 mm as a general rule of thumb, while it varies depending upon a sort of inorganic aggregate and resin, their composition rate, and the formation condition, and is decided appropriately considering these points. In a case of the artificial stone with a use of quartz as an inorganic aggregate and MMA resin, for instance, the measure can be 30 to 38 cm$^3$/m$^2$ for the average surface concave groove depth of 0.05 mm and 80 to 92 cm$^3$/m$^2$ for the average surface concave groove depth of 0.2 mm.

An effluent treatment for water-jet machining is easy in comparison with an etching method which employs an organic solvent.

Of course, parts of the surface can be removed, if needed, by means of processing in an organic solvent, softening or melting a resin component.

The organic solvent used in the above purpose may be selected in correspondence with a resin component. It includes, for instance, a halogenated hydrocarbon such as ethylene chloride, dichloromethane, and chloroform; carboxylic acid and the ester compound such as acetic acid anhydride, ethyl acetate, and butyl acetate; or acetone, tetrahydrofuran, DMF, and DMSO.

Convexoconcaves on the surface of the artificial stone compact can be formed by means of removing a softened or melted resin component from the surface after dipping the compact in these organic solvent or spraying or flowing these organic solvents on the compact.

The softened resin component may be scraped off from the surface with a wire brush or other scraping means.

In addition, particles may be exposed to the surface of the product as sections by means of grinding the surface and as the result, breaking the surface partially. Surface texture with unique depth, luster, and gloss are realized hereby. This is caused by a unique phenomenon of reflected light.

A means for surface polishing is not limited in particular. It can be carried out with a tool such as a grind stone, an abrasive cloth, and an abrasive belt, or an abrasive such as a buffing compound and a rubbing compound.

As abrasives, the followings are appropriately employed; diamond, boron carbide, corundum, alumina, and zirconia for mainly grinding, and tripoli, dolomite, alumina, chromium oxide, and cerium oxide for mainly polishing.

The surface can be roughened, after being polished in the above method.

The noctilucent/luminescent artificial stone product suited for various uses which includes products with or without non-slipperiness, is to be provided in the present invention with various manufacturing methods such as various forming methods, or various processing methods like cutting, scraping, laminating, and etching.

Various members and formations, for instance, for decorations for the night, buildings and public works such as direction indicators and guides for location by luminescence in a dark atmosphere, and disaster prevention, are to be provided. It is needles to say that the above products are utilized as a luminescent member or an optical formation for using no energy or saving energy.

By the way, there are several points which should be paid attention to, in the present invention.

It is that the following products are included in the noctilucent/luminescent artificial stone of the present invention; a product, for instance, as is shown in FIG. 1, consisting of the cut out artificial stone (12) as a thinner board than the molded board from the molded artificial stone (11) after cast and hardened; or the artificial stone (13) which was further processed on the artificial stone (12).

In addition, it is natural, but it is needless to say that a cut out artificial stone (15) in a sheet form from an artificial stone (14) which was carried out with non slip processing on the molded artificial stone (11) as is shown in FIG. 1, is also included in the artificial stone of the present invention.

The present invention also provides a formation in which the noctilucent/luminescent artificial stone is laminated as a surface material, or a formation in which the noctilucent/luminescent artificial stone is composed as a part of the surface.

As for a lamination composition, an integrated body is illustrated, which is composed of; the noctilucent/luminescent artificial stone of the present invention as a surface material; and a resin plate, a metal plate, a stone, a ceramic plate or a cement plate on the back, which is laminated with an adhesive, or bonded mechanically with metal fittings or fit bonds.

The followings are also illustrated; an integrated product in which the noctilucent/luminescent of the present invention is composed with an inorganic material such as a mortar concrete or a gypsum, or a resin as a backing material by means of casting and molding after the artificial stone was cast and hardened or semi-hardened; a product obtained by placing a tile, a gypsum plate, a metal plate, and glass at a predetermined site and casting and hardening the artificial stone; and a product obtained by molding the artificial stone of the present invention, and in the semi-hardened condition on the back side, placing a tile, a gypsum plate, a metal plate, and glass at a predetermined site, and hardening it with compression.

Figure 2:
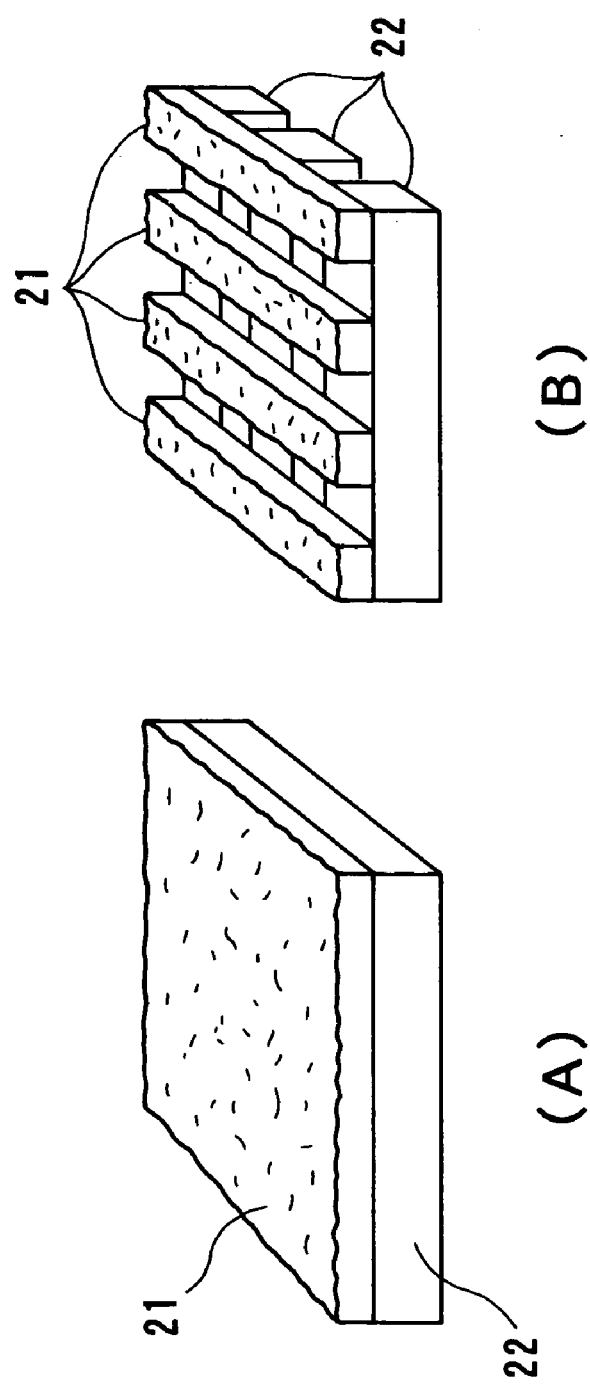
FIG. 2 illustrates a lamination composition of the noctilucent/luminescent artificial stone where (A) illustrates entire lamination and (B) illustrates partial lamination.

The following various products, as are shown in FIG. 2(A) for instance, may be included in the laminated composition; not only a product in which the noctilucent/luminescent artificial stone of the present invention (21) is entirely laminated with other sort of materials (22); but also a product partly laminated in a grating shape like FIG. 2(B); and a product laminated in a multi layer.

Figure 3:
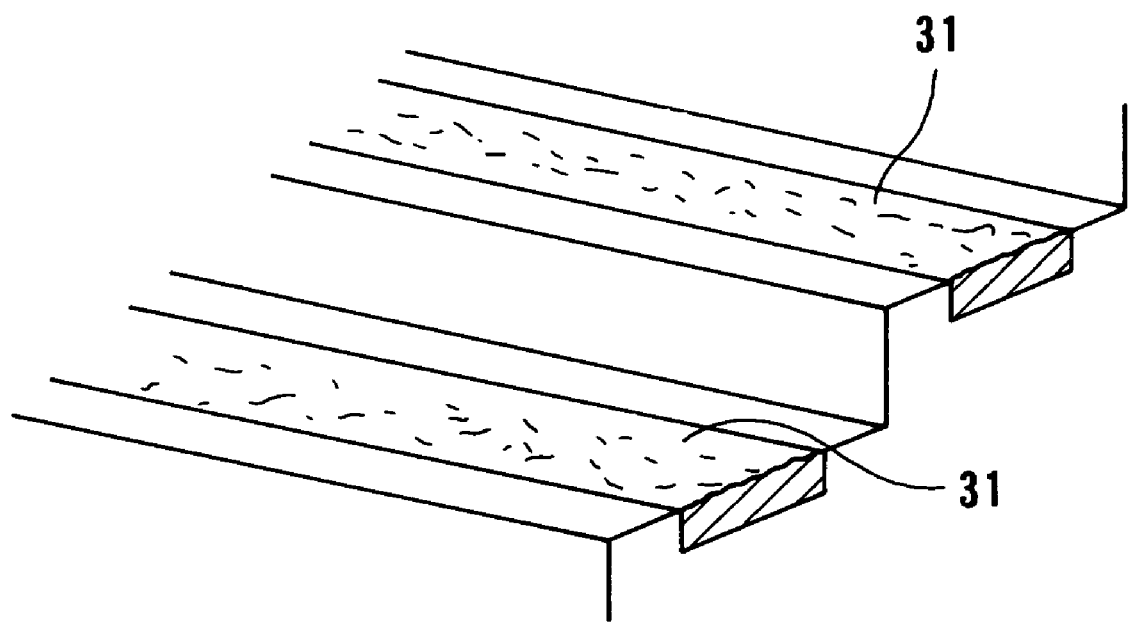
FIG. 3 shows the recessed noctilucent/luminescent artificial stone.
Figure 4:
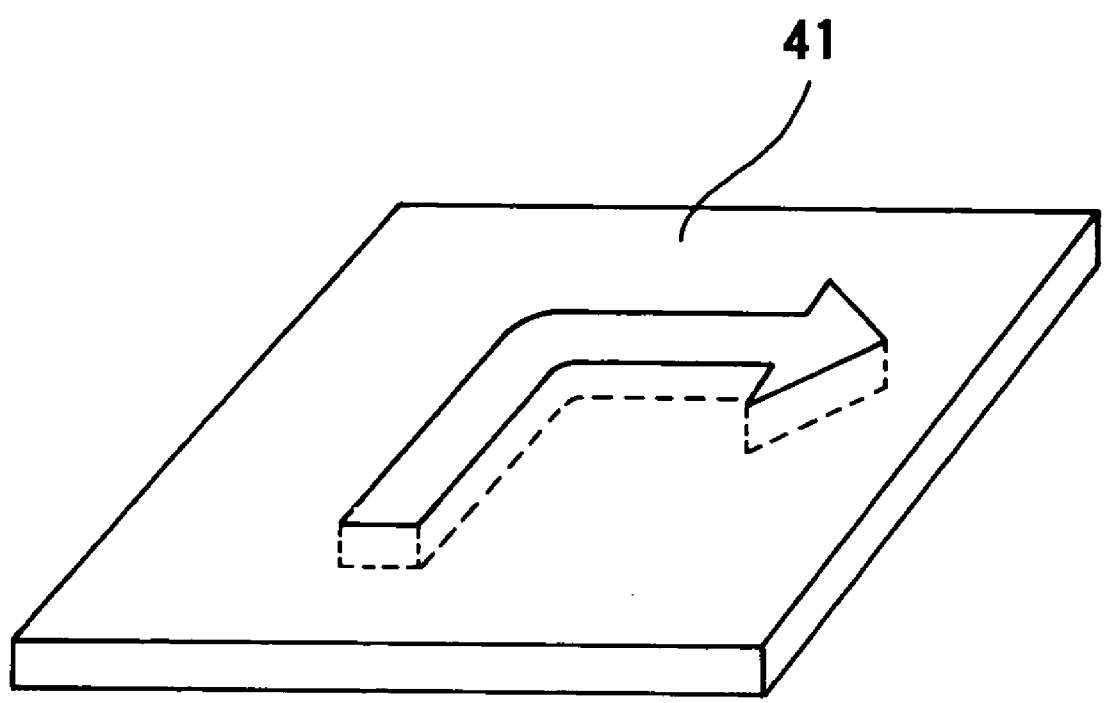
FIG. 4 shows the integrated noctilucent/luminescent artificial stone by implantation.

In addition, as for a product a part of which the noctilucent/luminescent artificial stone composes, the following appropriate constitutions are to be considered; a product in which the artificial stone similar to the noctilucent/luminescent artificial stone is placed through joints; a product in which the noctilucent/luminescent artificial stone (31) is arranged at a part of step of stairs as is shown in FIG. 3; a product as is shown in FIG. 4 in which an artificial stone, concrete materials, tile materials or the like without luminescence is molded with implantation in a predetermined place of the noctilucent/luminescent artificial stone (41) of the present invention as a base material.

Manufactured examples of the noctilucent/luminescent artificial stone of the present invention are described below. Of course, the present invention needs not to be limited by the following examples.

EXAMPLE 1

The materials are prepared to have the following composition, employing the aggregate of pulverized quartz (pulverized product) with a maximum particle diameter of 2.5 mm, an average particle diameter of 0.5 mm, MMA resin for a resin, and the filler of aluminium hydroxide with a particle diameter of 0.1 mm or less;

| | |
|---|---|
| Quartz aggregate | 47 vol % |
| Resin | 29 vol % |
| Aluminium hydroxide (average particle diameter of 40 μm) | 10 vol % |
| Light accumulation material | 13 vol % |

| -continued | |
|---|---|
| (strontium aluminate base: G-300C) (average particle diameter 40 μm). Each weight ratio was as follows. | |
| Quartz aggregate | 59 wt % |
| Resin | 15 wt % |
| Aluminium hydroxide | 9 wt % |
| Light accumulation material | 14 wt % |

A very small amount of a silane coupling agent and a hardening agent was also blended.

The mixture of the aggregate and the others as a syrup of MMA resin was cast into a molding-flask and was molded with compression to a board of 5 mm thick.

The obtained artificial stone was irradiated by light at 200 Lx with the D65 commonly used light source for 60 minutes (more than saturation time). The brightness after one hour of irradiation was 27.86 mcd/m$^2$, and the decay time to 3 mcd/m$^2$ was 14 hours and 30 minutes.

EXAMPLE 2

The artificial stone provided in Example 1 was removed from the mold and the surface was roughened by means of squirting water-jet of 1500 kg/cm$^2$ through a nozzle 30 mm distant from the surface. The artificial stone with surface concave grooves of 0.2 mm deep on an average hereby.

For the artificial stone, the bending strength was 90 N/cm, the hardness was 7 with Mohs' hardness of a quartz aggregate, and the water absorption was zero.

In addition, any abnormality was not recognized by an acid and alkaline resistance test with immersion in an aqueous solution of 3% hydrochloric acid for 8 hours and of 3% sodium hydroxide for 8 hours respectively.

Non-slipperiness of this artificial stone was excellent as follows;

| C.S.R. (men's shoes) | |
|---|---|
| Wet plane | 0.871 |
| Oil plane | 0.629 |
| C.S.R.B (bare foot), | |
| Wet plane | 1.465 |
| Soap plane | 1.223 |

The luminescence performance of the artificial stone to which non-slipperiness was given, was evaluated in the same method as Example 1 to confirm that the decay time to 3 mcd/m$^2$ was 14 hours 15 minutes and about the same value as Example 1.

As described in detail in the above, in the present invention, the improvement of the luminescence performance such as a longer continuation time of a light accumulation luminescence is enabled, and besides giving physical properties of extremely high and functional qualities such as strength, surface hardness, abrasion resistance, weatherability, and non-slipperiness are also enabled by a control of the structure of the artificial stone.

The invention claimed is:

1. An artificial stone, which comprises a transparent aggregate, at least one of a light accumulating material or luminescent material by ultraviolet rays, an inorganic filler and a resin, wherein the time required for brightness of the artificial stone after irradiation until saturation at 200Lx by a D65 common light source to reach 3 mcd/m$^2$ is longer than that for the light accumulation material or luminescent material by ultraviolet rays per se, and wherein the particle diameter of the transparent aggregate is 0.3 mm or more and 1/1.5 or less of the thickness of the artificial stone after casting and hardening;

the average particle diameter of the light accumulating material and/or the luminescent material by ultraviolet ray is 80 μm or more and 300 μm or less;

the particle diameter of the inorganic filler is less than 0.1 mm;

the volume of the transparent aggregate is 20% or more and 80% or less;

the amount of the resin is 25-70 volume %; and the artificial stone further comprises a nontransparent aggregate having a particle diameter which is 1/1.5 or less of the thickness of the artificial stone after casting and hardening, and wherein the total volume of the transparent aggregate and the nontransparent aggregate together in the artificial stone is 20% or more and 80% or less.

2. The artificial stone according to claim 1, wherein the filling factor (vol %) of the light accumulation material and/or luminescent material by ultraviolet ray contained in the artificial stone is lower than the maximum filling factor of the light accumulation material and/or luminescent material by ultraviolet ray per se.

3. The artificial stone according to claim 1, wherein the average particle diameter of the transparent aggregate is 1/200 or more and 1/3 or less of the thickness of the artificial stone after casting and hardening.

4. The artificial stone according to claim 1, wherein the transparent aggregate has an irregular surface configuration.

5. The artificial stone according to claim 1, wherein the average particle diameter of the light accumulation material and/or luminescent material by ultraviolet ray is 80 μm or more and 150 μm or less.

6. The artificial stone according to claim 1, wherein the average particle diameter of the inorganic filler is 30 μm or more and 70 μm or less.

7. The artificial stone according to claim 1, wherein the volume ratio of the filler and the light accumulation material, luminescent material by ultraviolet ray or mixture of both, defined as filler/light accumulation material and/or luminescent material by ultraviolet ray, is 100 or less.

8. The artificial stone according to claim 1, wherein the transparent aggregate is quartz or rock crystal and the filler is aluminum hydroxide or silica.

9. The artificial stone according to claim 1, wherein the transparent aggregate is glass and the filler is silica or aluminum hydroxide.

10. The artificial stone according to claim 1, wherein the time required for the brightness after irradiation until saturation at 200Lx by a D65 common light source to reach 3 mcd/m$^2$ is 12 hours or longer.

11. An artificial stone laminate, which comprises the artificial stone according to claim 1 as a surface material.

12. An artificial stone laminate, which comprises the artificial stone according to claim 1 as part of a surface material.

13. The artificial stone according to claim 3, wherein the transparent aggregate has an irregular surface configuration.

14. The artificial stone according to claim 2, wherein the transparent aggregate is quartz or rock crystal and the filler is aluminum hydroxide or silica.

15. The artificial stone according to claim 3, wherein the transparent aggregate is quartz or rock crystal and the filler is aluminum hydroxide or silica.

16. The artificial stone according to claim 4, wherein the transparent aggregate is quartz or rock crystal and the filler is aluminum hydroxide or silica.

17. The artificial stone according to claim 5, wherein the transparent aggregate is quartz or rock crystal and the filler is aluminum hydroxide or silica.

18. The artificial stone according to claim 6, wherein the transparent aggregate is quartz or rock crystal and the filler is aluminum hydroxide or silica.

19. The artificial stone according to claim 7, wherein the transparent aggregate is quartz or rock crystal and the filler is aluminum hydroxide or silica.

20. The artificial stone according to claim 2, wherein the transparent aggregate is glass and the filler is silica or aluminum hydroxide.

21. The artificial stone according to claim 3, wherein the transparent aggregate is glass and the filler is silica or aluminum hydroxide.

22. The artificial stone according to claim 4, wherein the transparent aggregate is glass and the filler is silica or aluminum hydroxide.

23. The artificial stone according to claim 5, wherein the transparent aggregate is glass and the filler is silica or aluminum hydroxide.

24. The artificial stone according to claim 6, wherein the transparent aggregate is glass and the filler is silica or aluminum hydroxide.

25. The artificial stone according to claim 7, wherein the transparent aggregate is glass and the filler is silica or aluminum hydroxide.

26. The artificial stone according to claim 2, wherein the time required for the brightness after irradiation until saturation at 200Lx by a D65 common light source to reach 3 mcd/m$^2$ is 12 hours or longer.

27. The artificial stone according to claim 3, wherein the time required for the brightness after irradiation until saturation at 200Lx by a D65 common light source to reach 3 mcd/m$^2$ is 12 hours or longer.

28. The artificial stone according to claim 4, wherein the time required for the brightness after irradiation until saturation at 200Lx by a D65 common light source to reach 3 mcd/m$^2$ is 12 hours or longer.

29. The artificial stone according to claim 5, wherein the time required for the brightness after irradiation until saturation at 200Lx by a D65 common light source to reach 3 mcd/m$^2$ is 12 hours or longer.

30. The artificial stone according to claim 6, wherein the time required for the brightness after irradiation until saturation at 200Lx by a D65 common light source to reach 3 mcd/m$^2$ is 12 hours or longer.

31. The artificial stone according to claim 7, wherein the time required for the brightness after irradiation until saturation at 200Lx by a D65 common light source to reach 3 mcd/m$^2$ is 12 hours or longer.

32. The artificial stone according to claim 8, wherein the time required for the brightness after irradiation until saturation at 200Lx by a D65 common light source to reach 3 mcd/m$^2$ is 12 hours or longer.

33. Previously presented) The artificial stone according to claim 9, wherein the time required for the brightness after irradiation until saturation at 200Lx by a D65 common light source to reach 3 mcd/m$^2$ is 12 hours or longer.

34. An artificial stone laminate, which comprises the artificial stone according to claim 2 as a surface material.

35. An artificial stone laminate, which comprises the artificial stone according to claim 3 as a surface material.

36. An artificial stone laminate, which comprises the artificial stone according to claim 4 as a surface material.

37. An artificial stone laminate, which comprises the artificial stone according to claim 5 as a surface material.

38. An artificial stone laminate, which comprises the artificial stone according to claim 6 as a surface material.

39. An artificial stone laminate, which comprises the artificial stone according to claim 7 as a surface material.

40. An artificial stone laminate, which comprises the artificial stone according to claim 8 as a surface material.

41. An artificial stone laminate, which comprises the artificial stone according to claim 9 as a surface material.

42. An artificial stone laminate, which comprises the artificial stone according to claim 10 as a surface material.

43. An artificial stone laminate, which comprises the artificial stone according to claim 2 as part of a surface material.

44. An artificial stone laminate, which comprises the artificial stone according to claim 3 as part of a surface material.

45. An artificial stone laminate, which comprises the artificial stone according to claim 4 as part of a surface material.

46. An artificial stone laminate, which comprises the artificial stone according to claim 5 as part of a surface material.

47. An artificial stone laminate, which comprises the artificial stone according to claim 6 as part of a surface material.

48. An artificial stone laminate, which comprises the artificial stone according to claim 7 as part of a surface material.

49. An artificial stone laminate, which comprises the artificial stone according to claim 8 as part of a surface material.

50. An artificial stone laminate, which comprises the artificial stone according to claim 9 as part of a surface material.

51. An artificial stone laminate, which comprises the artificial stone according to claim 10 as part of a surface material.

* * * * *